US010298051B2

(12) United States Patent
Yuan et al.

(10) Patent No.: US 10,298,051 B2
(45) Date of Patent: May 21, 2019

(54) CHARGING POSITION PROMPTING METHOD AND ELECTRONIC DEVICE

(71) Applicant: Lenovo (Beijing) Co., Ltd., Beijing (CN)

(72) Inventors: Keming Yuan, Beijing (CN); Hesheng Liu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 57 days.

(21) Appl. No.: 15/486,457

(22) Filed: Apr. 13, 2017

(65) Prior Publication Data

US 2017/0338682 A1 Nov. 23, 2017

(30) Foreign Application Priority Data

May 20, 2016 (CN) .......................... 2016 1 0342271

(51) Int. Cl.
*H02J 7/02* (2016.01)
*H04B 5/00* (2006.01)
*H02J 50/10* (2016.01)
*H02J 50/90* (2016.01)
*G08B 21/18* (2006.01)

(52) U.S. Cl.
CPC .............. *H02J 7/025* (2013.01); *G08B 21/18* (2013.01); *H02J 7/027* (2013.01); *H02J 50/10* (2016.02); *H02J 50/90* (2016.02); *H04B 5/0037* (2013.01)

(58) Field of Classification Search
CPC .. H02J 7/025; H02J 7/027; H02J 50/10; H02J 50/90; H04B 5/0037; G08B 21/18
USPC ................................. 320/108; 455/41.1, 573
See application file for complete search history.

(56) References Cited

U.S. PATENT DOCUMENTS

| 7,348,877 | B2 * | 3/2008 | Chen ..................... B60R 25/102 |
| | | | 340/425.5 |
| 8,658,951 | B2 * | 2/2014 | Yonenaga ......... H01L 21/67303 |
| | | | 219/634 |
| 10,062,492 | B2 * | 8/2018 | Wagman ............. H01F 27/2804 |
| 2011/0128714 | A1 | 6/2011 | Terao et al. |
| 2015/0234493 | A1 * | 8/2015 | Parivar .................. G06F 3/044 |
| | | | 345/174 |

FOREIGN PATENT DOCUMENTS

| CN | 101950999 A | 1/2011 |
| CN | 104034971 A | 9/2014 |
| CN | 105337330 A | 2/2016 |

* cited by examiner

*Primary Examiner* — M Baye Diao
(74) *Attorney, Agent, or Firm* — Anova Law Group, PLLC

(57) ABSTRACT

A method for prompting charging position includes acquiring a value of a first charging parameter through a first induction coil of an electronic device, determining whether a prompt message needs to be sent out based on the value of the first charging parameter, and after outputting the prompt message is determined, sending out the prompt message through an output unit of the electronic device to guide a user to move the electronic device to change a relative position between the electronic device and a wireless charging device from a first relative position to a second relative position. Further, the electric power obtained by and converted through the first induction coil when the relative position is the first relative position is smaller than the electric power obtained by and converted through the first induction coil when the relative position is the second relative position.

18 Claims, 6 Drawing Sheets

CHARGING POSITION PROMPTING METHOD AND ELECTRONIC DEVICE

CROSS-REFERENCES TO RELATED APPLICATIONS

This application claims priority of Chinese Patent Application No. 201610142271.4, filed on May 20, 2016, the entire contents of which are hereby incorporated by reference.

FIELD OF THE INVENTION

The present disclosure generally relates to the field of electronic technology and, more particularly, relates to a method for prompting charging position and an electronic device.

BACKGROUND

With the continuous development of science and technology, electronic technology has been quickly developed, the types of electronic products have been expanded, and people have also enjoyed a variety of convenience brought by the development of science and technology. Now, through various electronic devices, people are able to enjoy comfortable life due to the development of science and technology.

Currently, people may be able to charge electronic devices using either a wired charging method or a wireless charging method. During a wireless charging process, to achieve desired charging results, electronic devices may need to be placed on specific positions of the wireless charging device. However, when a wireless charging device is used, the user may not know where the electronic device needs to be placed in order to achieve desired charging efficiency. Frequently, the user may randomly place the electronic device on the wireless charging device, which may lead to low charging efficiency.

The disclosed method for prompting charging position and electronic device are directed to solve one or more problems set forth above and other problems.

BRIEF SUMMARY OF THE DISCLOSURE

A first aspect of the present disclosure is a method for prompting the charging position of an electronic device. The method includes acquiring a value of a first charging parameter through a first induction coil of the electronic device, determining whether a prompt message needs to be sent out based on the value of the first charging parameter, and after outputting the prompt message is determined, sending out the prompt message through an output unit of the electronic device to guide a user to move the electronic device to change a relative position between the electronic device and a wireless charging device from a first relative position to a second relative position. Further, the electric power obtained by and converted through the first induction coil when the relative position between the electronic device and the wireless charging device is the first relative position is smaller than the electric power obtained by and converted through the first induction coil when the relative position between the electronic device and the wireless charging device is the second relative position.

A second aspect of the present disclosure is an electronic device. The electronic device includes a first induction coil, an output unit, and a processor coupled to the first induction coil and the output unit. The processor obtains a value of a first charging parameter through the first induction coil; determines whether a prompt message needs to be sent out based on the value of the first charging parameter; and, when outputting the prompt message is determined, sends out the prompt message through the output unit of the electronic device to guide a user to move the electronic device to change a relative position between the electronic device and a wireless charging device from a first relative position to a second relative position. Further, the electric power obtained by and converted through the first induction coil when the relative position between the electronic device and the wireless charging device is the first relative position is smaller than the electric power obtained by and converted through the first induction coil when the relative position between the electronic device and the wireless charging device is the second relative position.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts. The described embodiments are some but not all of the embodiments of the present invention. Based on the disclosed embodiments and without inventive efforts, persons of ordinary skill in the art may derive other embodiments consistent with the present disclosure, all of which are within the scope of the present invention.

According to disclosed embodiments, the disclosed electronic device may include a personal computer (PC), a personal access device (PAD), a cellphone, a notebook computer, a tablet computer, a smartphone, or any other appropriate electronic device.

Figure 1:
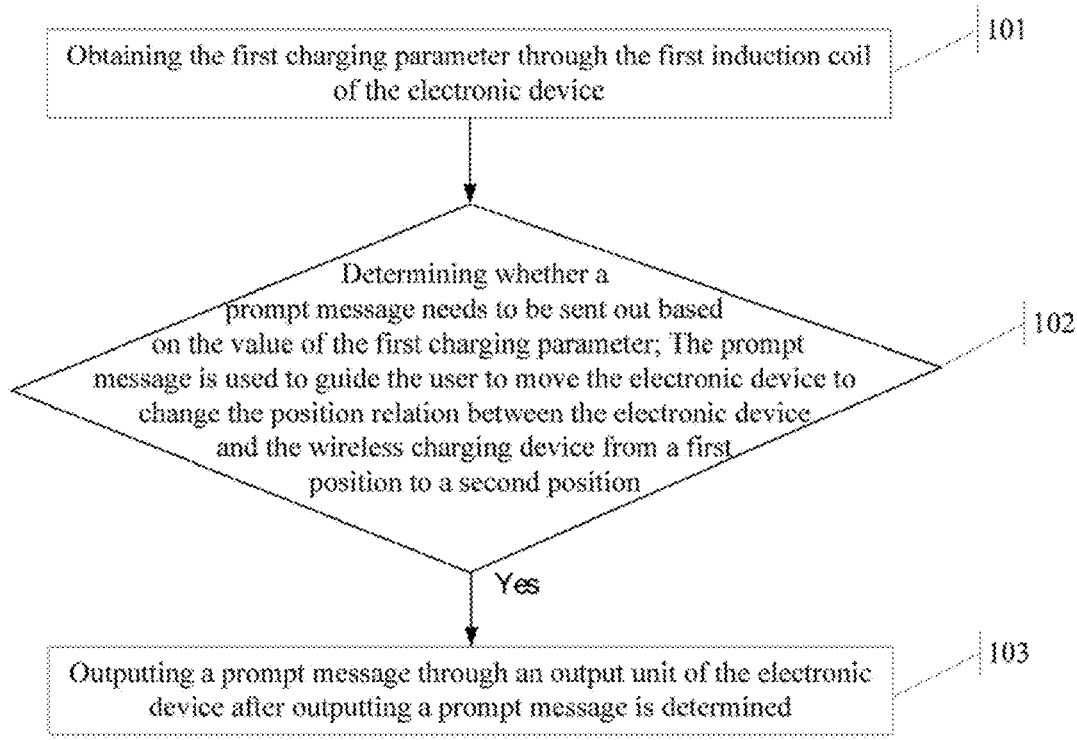
FIG. 1 illustrates a flow chart of an example of the methods for prompting charging position consistent with the disclosed embodiments.

The present disclosure provides a method for informing the charging position of an electronic device. The method may be used in a charging process to assist user optimizing the position of the electronic device that needs to be charged in order to achieve desired charging efficiency. FIG. 1 illustrates a flow chart of an example of the methods for informing the charging position consistent with the disclosed embodiments. Referring to FIG. 1, the method may include the following steps.

Step 101: Acquiring the value of a first charging parameter through a first induction coil of the electronic device.

Step 102: Determining whether a prompt message needs to be sent out based on the value of the first charging parameter. The prompt message may be used to guide the user to move the electronic device and, thus, change the relative position between the electronic device and the wireless charging device from a first relative position to a second relative position.

The relative position between the electronic device and the wireless charging device may be defined as a distance between a predetermined point on the electronic device and a predetermined point on the wireless charging device. For example, the predetermined point on the electronic device may be the center of the first induction of the electronic device, while the predetermined point on the wireless charging device may be the center of a second induction coil in the wireless charging device.

Accordingly, the relative position between the electronic device and the wireless charging device may then be defined as the distance between the center of the first induction coil in the electronic device and the center of the second induction coil in the wireless charging device.

Further, the electric power obtained by and converted through the first induction coil, when the relative position between the electronic device and the wireless charging device is a first relative position, may be smaller than the electric power obtained by and converted through the first induction coil when the relative position between the electronic device and the wireless charging device is a second relative position. That is, when the relative position the electronic device and the wireless charging device changes from the first relative position to the second relative position by moving the electronic device under the guidance of the prompt message, the electric power obtained by and converted through the first induction coil may increase.

Step 103: Outputting the prompt message through an output unit of the electronic device after outputting the prompt message is determined.

Optionally, the first charging parameter may include electric current, electric voltage, magnetic flux, or any other appropriate parameters associated with the charging process. In general, any appropriate parameter that can be used to represent the charging status of the electronic device may be used as the first charging parameter for the disclosed methods. Therefore, the electronic device may be able to determine whether the current position of the electronic device can result in desired charging effects through the first charging parameter which has a variety of selections, and thus determine whether a prompt message needs to be sent to the user. As such, the disclosed method may be relatively flexible in determining whether a prompt message needs to be sent out.

The first induction coil may include one or more induction coils in the electronic device. For example, the first induction coil may be induction coils used to couple with an induction coil in the wireless charging device to obtain electric power through the electromagnetic induction effect.

The electronic device may acquire the value of the first charging parameter through the first induction coil. Moreover, the value of the first charging parameter may be acquired in real time, or in a certain time interval. For example, the electronic device may acquire the value of the first charging parameter with an interval of one second, i.e., once every one second.

Further, whether a prompt message needs to be sent out may be determined by the value of the first charging parameter. The prompt message may be used to guide the user to move the electronic device to a position with higher charging efficiency and then continue the charging process. When the first charging parameter determines that the relative position between the electronic device and the wireless charging device is able to provide desired charging efficiency, no prompt message may be sent out. However, when the first charging parameter determines that the relative position between the electronic device and the wireless charging device is unable to provide desired charging efficiency, a prompt message may then be sent out.

Various ways may be used to determine whether a prompt message needs to be sent out through the first charging parameter.

In certain embodiments, whether a prompt message needs to be sent out may be determined by judging whether the value of the first charging parameter meets a first preset condition. When the value of the first charging parameter meets the first preset condition, the position of the electronic device may be determined as an optimal or desired charging position and, accordingly, no prompt message may be sent out. However, when the value of the first charging parameter does not meet the first preset condition, the position of electronic device may then be determined as a non-optimal or undesired charging position and, accordingly, a prompt message may be sent out. Moreover, when the electronic device is located at the optimal charging position, the time used to fully charge the electronic device may be the shortest.

The first preset condition may be a factory-preset condition of the electronic device. The first preset condition may also be a user-defined condition. Moreover, the first preset condition may be revisable based on the actual needs.

For example, the first charging parameter may include the electric current during the charging process, and accordingly, the first preset condition may correspond to an electric current greater than 4.5 A during the charging process. Further, the value of the first charging parameter obtained through the first induction coil, i.e. the electric current during the charging process, is 4.7 A. In such a case, the first charging parameter meets the first preset condition, and accordingly, no prompt message may be sent out.

For another example, the value of the first charging parameter obtained through the first induction coil, i.e. the electric current during the charging process, is 4.0 A. Therefore, the first charging parameter may not meet the first preset condition, and accordingly, it is determined that a prompt message may be sent out.

Through the method described above, whether a prompt message needs to be sent out may be conveniently and accurately determined through the value of the first charging parameter. As such, the electronic device may have an extra function according to the present disclosure and the electronic device becomes more intelligent.

In certain other embodiments, whether a prompt message needs to be sent out may be determined through the following process. First, a first position of the electronic device may be determined based on the value of the first charging parameter and the predetermined correlation between the charging parameter and the position of the electronic device. Further, whether the first position is an optimal charging position may be determined. Specifically, when the electronic device is at the optimal charging position, the time used to fully charge the electronic device may be the shortest. When the first position is the optimal charging position, no prompt message may be sent out; however, when the first position is not the optimal charging position, a prompt message may need to be sent out.

The optimal charging position may correspond to a position at which the charging speed for the electronic device is the highest. For example, when the electronic device is placed on a wireless charging device, the induction coils (i.e. the first induction coil) in the electronic device may be coupled to the induction coils (e.g. a second induction coil) in the wireless charging device to obtain electric power through the electromagnetic induction effect. When the center of the induction coils in the electronic device overlaps with the center of the induction coils in the wireless charging device, the position of the electronic device may be determined as the optimal charging position.

Figure 2:
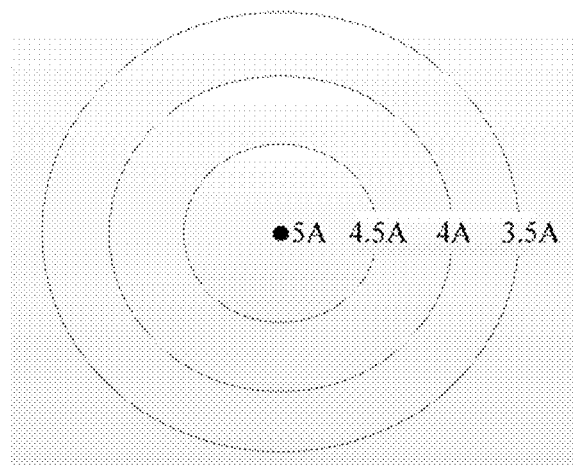
FIG. 2 illustrates a schematic diagram of the correlation between a first charging parameter and the position of an electronic device consistent with disclosed embodiments.

Further, the correlation between the value of the first charging parameter and the position of the electronic device may be predetermined. FIG. 2 shows a schematic diagram of an example of predetermined correlation between the first charging parameter and the position of the electronic device consistent with disclosed embodiments.

Referring to FIG. 2, the first charging parameter may include the electric current. When the electronic device is located at the optimal charging position, the value of the first charging parameter (i.e. the electric current) obtained through the first induction coil of the electronic device may be 5 A. When the center of the first induction coil is on the first circle away from the center of the second induction coil, the corresponding electric current obtained through the first induction coil may be 4.5 A.

Further, when the center of the first induction coil is on the second circle away from the center of the second induction coil, the corresponding electric current obtained through the first induction coil may be 4 A. Moreover, when the center of the first induction coil is on the third circle away from the center of the second induction coil, the corresponding electric current obtained through the first induction coil may be 3.5 A. In this manner, the electric current obtained through the first induction coil may be smaller as the center of the first induction coil moves away from the center of the second induction coil.

Further, referring to the correlation between the value of the electric current and the position of the electronic device shown in FIG. 2, when the present electric current obtained through the first induction coil is 4 A, the electric device may be determined as being at a non-optimal charging position because the obtained electric current is below 5 A, the value that corresponds to the shortest charging time. In the meantime, the present position of the electronic device may be determined as a position that corresponds to the center of the first induction coil locating on the second circle away from the center of the second induction coil. Accordingly, it is determined that a prompt message may be sent out. Further, the prompt message may guide the user to move the electronic device toward the optimal charging position, where the electric current obtained through the first induction coil is 5 A.

According to the method described above, the position of the electronic device may be approximately determined, and the disclosed method may further inform the user when the present position of the electronic device is not at the optimal charging position and guide the user to move the electronic device in order to improve the charging efficiency.

In certain other embodiments, whether a prompt message needs to be sent out may be determined through the following process. First, during the process to obtain the value of the first charging parameter, a relative position between the electronic device and the wireless charging device may be obtained based on a predetermined strategy. Then, whether a prompt message needs to be sent out may be determined based on the obtained relative position between the electronic device and the wireless charging device.

The predetermined strategy may be a preset strategy used to obtain the relative position between the electronic device and the wireless charging device. In general, any strategy that can be used to obtain the relative position between the electronic device and the wireless charging device may be used as the predetermined strategy according to the present disclosure. For example, a transducer or other appropriate components that can be used to detect the position of the electronic device may be placed in the electronic device. Further, through the transducer or other components, the relative position between the electronic device and the wireless charging device may be directly obtained.

Figure 3:
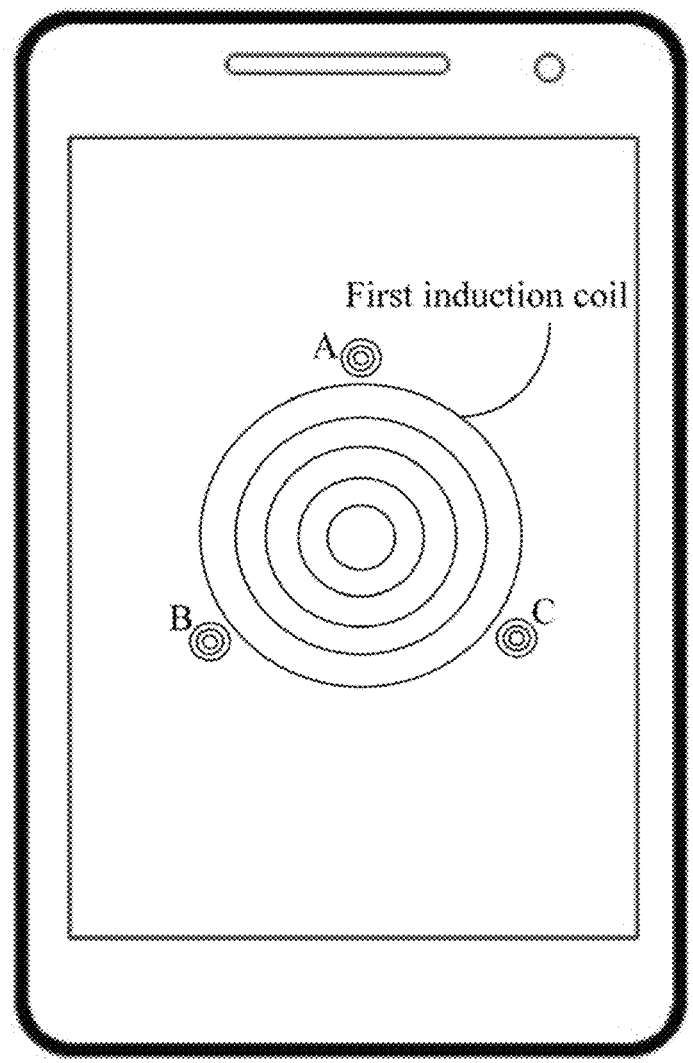
FIG. 3 illustrates a schematic diagram for acquiring the relative position according to a method for prompting charging position consistent with disclosed embodiments.

FIG. 3 illustrates a schematic diagram for acquiring the relative position according to a method for informing the charging position consistent with disclosed embodiments.

Referring to FIG. 3, three small coils, A, B, and C may be placed in the electronic device to surround the first induction coil and may be used to obtain electric power. During the process to charge the electronic device, the three small coils may all be able to detect magnetic flux. Further, the relative position between the electronic device and the wireless charging device may be determined by analyzing the magnetic flux values detected by the three small coils.

Optionally, after obtaining the relative position between the electronic device and the wireless charging device, whether a prompt message needs to be sent out may also be determined. In such a case, when the relative position indicates that the first induction coil completely covers the second induction coil, it is determined that no prompt message needs to be sent out.

However, when the relative position indicates that the first induction coil does not completely cover the second induction coil, it is then determined that a prompt message may need to be sent out. When an alternating current (AC) is applied to the second induction coil, a current may be generated in the first induction coil through the electromagnetic induction effect, and the electronic device may be charged.

In other words, when the obtained relative position indicates that the first induction coil completely covers the second induction coil, the electronic device may have been placed on the position with the highest charging efficiency, and thus no prompt message may be sent out. However, when the obtained relative position indicates that the first induction coil does not completely cover the second induction coil, charging at the present position of the electronic device may not be able to achieve the desired charging effects. Therefore, a prompt message to inform the user to move the electronic device may be sent out. Further, by moving the electronic device under the guidance of the prompt message, the charging efficiency of the electronic device may then be improved.

According to the disclosed method, the determined relative position between the electronic device and the wireless charging device may be fairly accurate. Further, the disclosed method may accurately inform the user how to move the electronic device in order to improve the charging efficiency.

When any of the methods described above is used to determine that a prompt message needs to be sent out, the prompt message may be sent out from an output unit of the electronic device. Any appropriate output method may be used to send out the prompt message. For example, the prompt message may be sent out as a voice message, and accordingly, the output unit may be a speaker.

For another example, the prompt message may also be sent out through a display interface of the electronic device, and accordingly, the output unit may be a display unit of the electronic device. The prompt message may also be sent out through any other appropriate method using a proper output unit of the electronic device corresponding to the output method.

Optionally, outputting the prompt message through a display interface of the electronic device may include outputting a navigation interface through the display unit of the electronic device and also displaying a first content on the navigation interface. The first content may include a moving-direction indicator used to indicate a first direction to move the electronic device in order to reach the second relative position.

Figure 4:
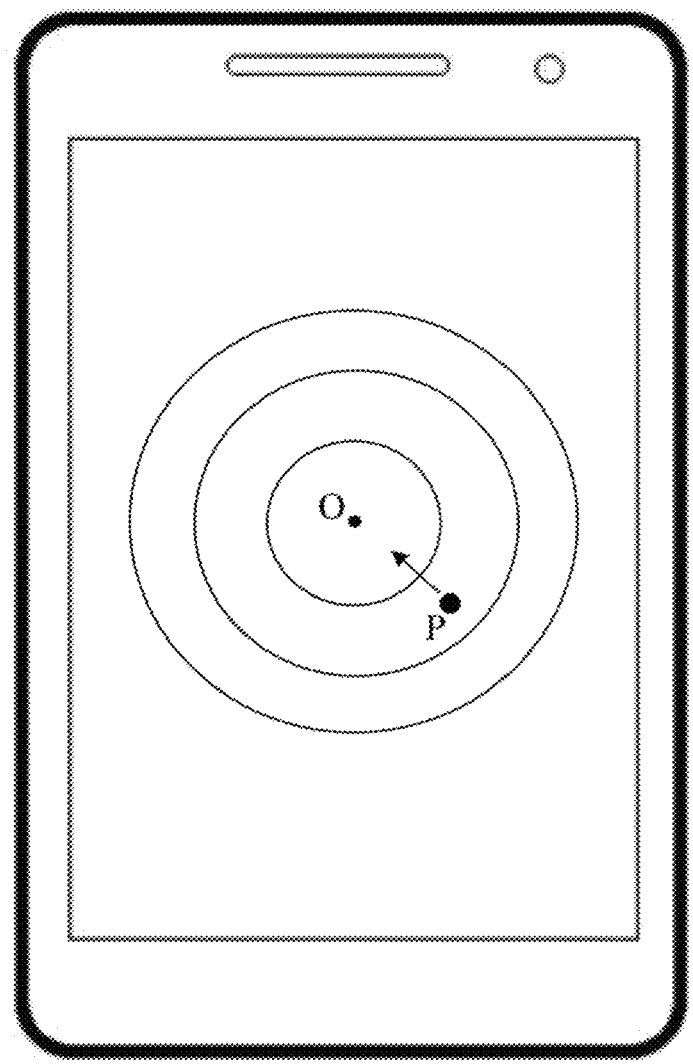
FIG. 4 illustrates a schematic diagram of a navigation interface according to a method for prompting charging position consistent with disclosed embodiments.

FIG. 4 illustrates a schematic diagram of a navigation interface according to a method for prompting charging position consistent with disclosed embodiments.

Referring to FIG. 4, a navigation interface may be outputted to the display unit of the electronic device. A first content may include the content shown in the navigation interface in FIG. 4. For example, a schematic diagram of the second induction coil of the wireless charging device may be displayed on the navigation interface.

Specifically, point O in FIG. 4 may represent the center of the second induction coil, while point P may represent the center of the first induction coil in the electronic device. The second relative position may correspond to a position with the first induction coil completely covering the second induction coil, that is, the second relative position may correspond to a position with point P overlapping with point O. Further, the navigation interface may display a moving-direction indicator, represented by an arrow shown in FIG. 4, to guide the user to move the electronic device toward point O.

Figure 5:
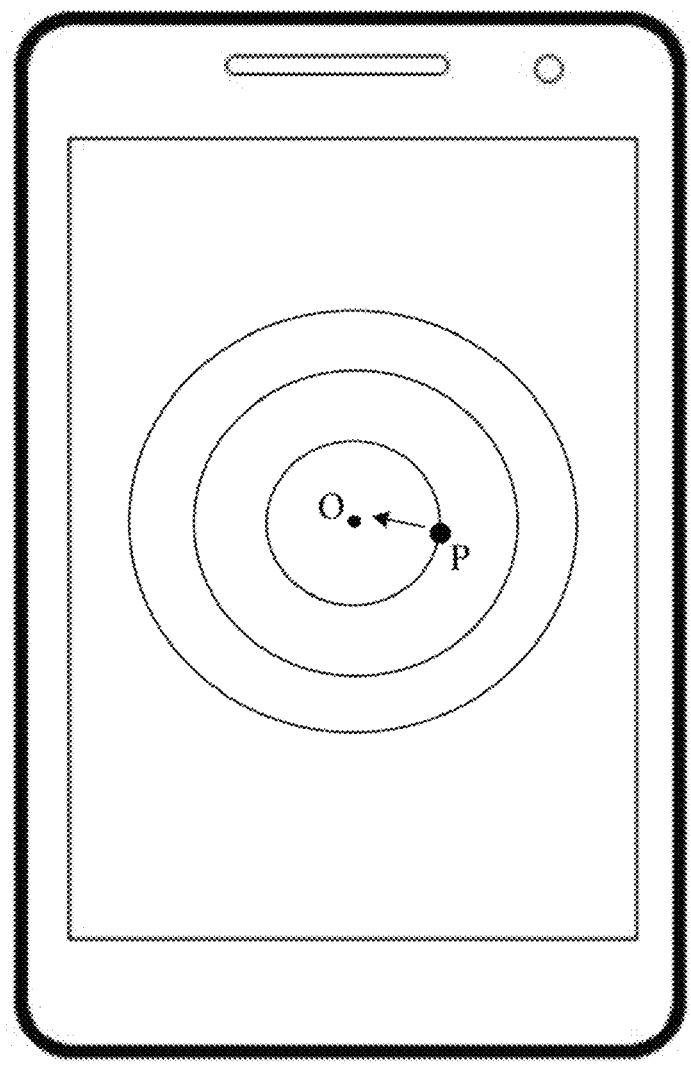
FIG. 5 illustrates a schematic diagram of a navigation interface according to a method for prompting charging position consistent with disclosed embodiments.

After the user viewed the navigation interface shown in FIG. 4, the electronic device may be moved by the user according to the navigation interface. FIG. 5 illustrates a schematic diagram of a navigation interface after the user moved the electronic device under the guidance of the navigation interface shown in FIG. 4.

Referring to FIG. 5, the electronic device may be moved to a position represented by point P. The navigation interface may update itself in real time based on the current position of the electronic device. Moreover, the moving-direction indicator used to indicate the moving direction still points to point O, that is, the moving-direction indicator in FIG. 5 still points to the center of the second induction coil.

According to the method described above, user may intuitively know how to move the electronic device in order to improve the charging efficiency. Therefore, the disclosed method may demonstrate desired user experience.

Optionally, a second content may be displayed on the prompt navigation interface. The second content may be used to indicate the expected charging time to fully charge the electronic device at the present location of the electronic device.

Figure 6:
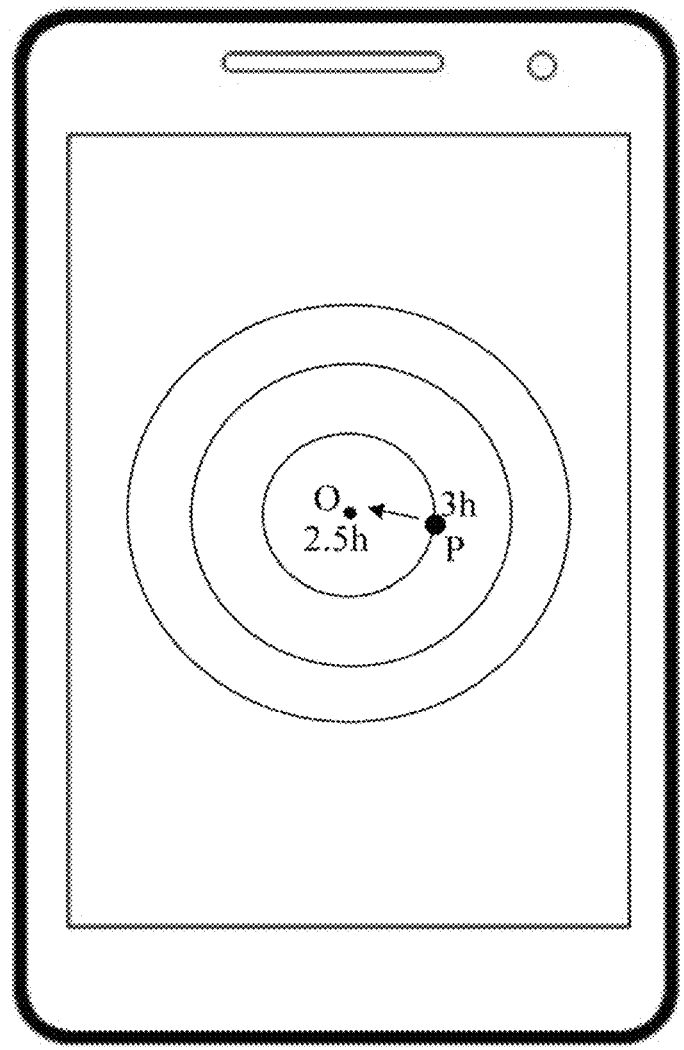
FIG. 6 illustrates a schematic diagram of a navigation interface according to a method for prompting charging position consistent with disclosed embodiments.

For example, referring to FIG. 6, the navigation interface may indicates that the present location of the electronic device is at point P. In addition, as shown in FIG. 6, the electronic device may need three hours of the charging time to be fully charged at the present location. Accordingly, a '3 h' message (i.e. the second content) may be directly displayed on the navigation interface close to point P.

Further, the navigation interface may also display the expected full charging time when the electronic device is moved to the second relative position. For example, as shown in FIG. 6, a '2.5 h' message may be displayed on the navigation interface close to point O. Similarly, the expected full charging time corresponding to other positions may also be displayed on the navigation interlace.

According to the method described above, user may intuitively know the approximate time that is required to fully charge the electronic device. Therefore, the disclosed method may demonstrate desired user experience.

Figure 7:
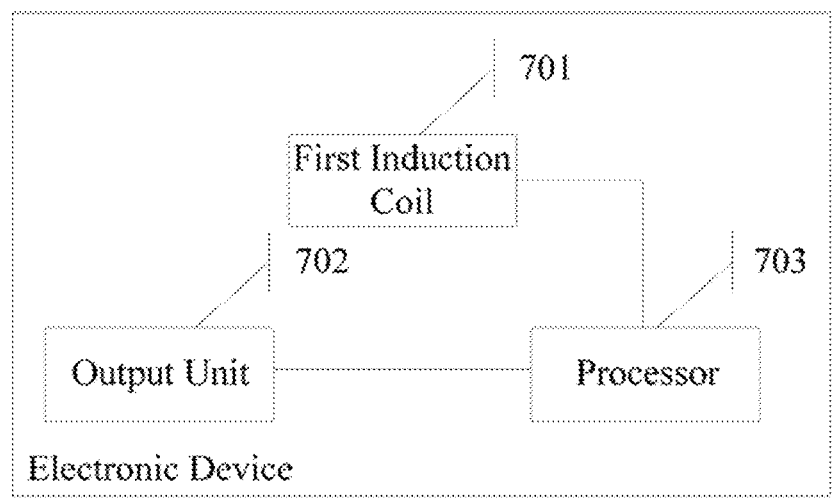
FIG. 7 illustrates a schematic structural diagram of an example of the electronic devices consistent with disclosed embodiments.

The present disclosure further provides an electronic device corresponding to the disclosed method for prompting charging position. FIG. 7 illustrates a schematic structural diagram of an example of the electronic devices consistent with disclosed embodiments.

Referring to FIG. 7, the electronic device may include a first induction coil 701, an output unit 702, and a processor 703. Other components may also be included.

The processor 703 may be a general-purpose central processing unit (CPU) or an application specific integrated circuit (ASIC). In other embodiments, the processor 703 may also be one or more integrated circuits (ICs).

The processor 703 may be used to obtain a first charging parameter through the first induction coil 701 and determine whether a prompt message needs to be sent out based on the obtained value of the first charging parameter. The prompt message may be used to guide the user to move the electronic device and thus change the relative position between the electronic device and the wireless charging device from a first relative position to a second relative position. Specifically, the electric power obtained by and converted through the first induction coil when the relative position between the electronic device and the wireless charging device is the first relative position may be smaller than the electric power obtained by and converted through the first induction coil when the relative position between the electronic device and the wireless charging device is the second relative position. Further, when outputting a prompt message is determined, the prompt message may be sent out through the output unit 702.

Optionally, the processor 703 may be configured to judge whether the value of the first charging parameter meets a first preset condition. When the value of the first charging parameter meets the first preset condition, the position of the electronic device may be determined as an optimal charging position, and accordingly, no prompt message may need to be sent out. However, when the value of the first charging parameter does not meet the first preset condition, the position of electronic device may then be determined as a non-optimal charging position, and accordingly, it is determined that a prompt message may need to be sent out. Moreover, when the electronic device is located at the optimal charging position, the time used to fully charge the electronic device may be the shortest.

Optionally, the processor 703 may be configured to determine a first position of the electronic device based on the value of the first charging parameter and the predetermined correlation between the charging parameter and the position of the electronic device. The processor 703 may also be configured to further determine whether the first position of the electronic device is the optimal charging position. When the electronic device is located at the optimal charging position, the time used to tally charge the electronic device may be the shortest.

Further, when the first position is the optimal charging position, it is determined that no prompt message may need to be sent out; however, when the first position is not the optimal charging position, it is determined that a prompt message may need to be sent out.

Optionally, the processor 703 may be configured to obtain the relative position between the electronic device and the wireless charging device based on a predetermined strategy during the process to obtain the value of the first charging parameter. In addition, the processor 703 may also be configured to further determine whether a prompt message needs to be sent out based on the obtained relative position between the electronic device and the wireless charging device.

Optionally, the processor 703 may determine that no prompt message needs to be sent out when the relative position indicates the first induction coil 701 completely covers the second induction coil in the wireless charging device. However, the processor 703 may determine that a prompt message may need to be sent out when the relative position indicates the first induction coil 701 does not completely cover the second induction coil in the wireless charging device.

Optionally, the processor 703 may be configured to send out a navigation interface through a display unit of the electronic device and display a first content on the navigation interface. The first content may include a moving-direction indicator used to indicate a first direction to move the electronic device in order to reach the second relative position.

Optionally, the process 703 may be configured to display a second content on the prompt navigation interface. The second content may be used to indicate the expected charging time to fully charge the electronic device at the present location.

Optionally, the first charging parameter may include at least one from electric current, electric voltage, and magnetic flux.

Figure 8:
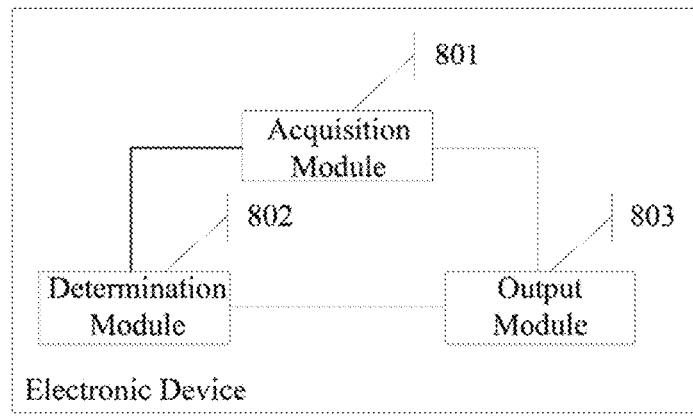
FIG. 8 illustrates a schematic functional diagram of an example of the electronic devices consistent with disclosed embodiments.

The present disclosure also provides another electronic device corresponding to the disclosed methods for informing the charging position. FIG. 8 illustrates a schematic functional diagram of an example of the electronic devices consistent with disclosed embodiments.

Referring to FIG. 8, the electronic device may include an acquisition module 801, a determination module 802, and an output module 803. Other components may also be included.

The acquisition module 801 may be used to obtain the value of a first charging parameter through a first induction coil of the electronic device. The determination module 802 may be used to determine whether a prompt message needs to be sent out based on the value of the first charging parameter. The prompt message may be used to guide the user to move the electronic device and thus change the relative position between the electronic device and the wireless charging device from a first relative position to a second relative position. Specifically, the electric power obtained by and converted through the first induction coil when the relative position between the electronic device and the wireless charging device is the first relative position may be smaller than the electric power obtained by and converted through the first induction coil when the relative position between the electronic device and the wireless charging device is the second relative position. Further, when outputting a prompt message is determined, the output module 803 may be used to send out the prompt message through an output unit of the electronic device.

Optionally, the determination module 802 may be configured to determine whether the value of the first charging parameter meets a first preset condition.

When the value of the first charging parameter meets the first preset condition, the position of the electronic device may be determined as an optimal charging position, and accordingly, it is determined that no prompt message may need to be sent out. However, when the value of the first charging parameter does not meet the first preset condition, the position of electronic device may then be determined as a non-optimal charging position, and accordingly, it is determined that a prompt message may need to be sent out. Moreover, when the electronic device is located at the optimal charging position, the time used to fully charge the electronic device may be the shortest.

Optionally, the determination module 802 may be configured to determine a first position of the electronic device based on the value of the first charging parameter and the predetermined correlation between the charging parameter and the position of the electronic device. Moreover, the determination module 802 may also be configured to further determine whether the first position is the optimal charging position. Specifically, when the electronic device is located at the optimal charging position, the time used to fully charge the electronic device may be the shortest.

Further, when the first position is the optimal charging position, it is determined that no prompt message may need to be sent out; however, when the first position is not the optimal charging position, it is determined that a prompt message may need to be sent out.

Optionally, the determination module 802 may be configured to obtain the relative position between the electronic device and the wireless charging device based on a predetermined strategy during the process to obtain the value of the first charging parameter. In addition, the determination module 802 may also be configured to further determine whether a prompt message needs to be sent out based on the obtained relative position between the electronic device and the wireless charging device.

Optionally, the determination module 802 may determine that no prompt message needs to be sent out when the relative position indicates the first induction coil completely covers the second induction coil in the wireless charging device. However, the determination module 802 may determine that a prompt message needs to be sent out when the relative position indicates the first induction coil does not completely cover the second induction coil in the wireless charging device.

Optionally, the output module 803 may be configured to send out a navigation interface through a display unit of the electronic device and also to display a first content on the navigation interface. The first content may include a moving-direction indicator used to indicate a first direction to move the electronic device in order to reach the second relative position.

Optionally, the electronic device may further include a display module. The display module may be used to display a second content on the prompt navigation interface. The second content may be used indicate the expected charging time to fully charge the electronic device at the present location.

Optionally, the first charging parameter may include at least one from electric current, electric voltage, and magnetic flux.

According to the disclosed methods and electronic devices, each of the electronic devices schematically illustrated in FIG. 7 and FIG. 8 may be able to realize the disclosed methods for informing the charging position as schematically illustrated in the flow chart in FIG. 1. Moreover, the procedure performed by each module of the electronic device may correspond to a certain frame shown in the flow chart in FIG. 1.

Figure 9:
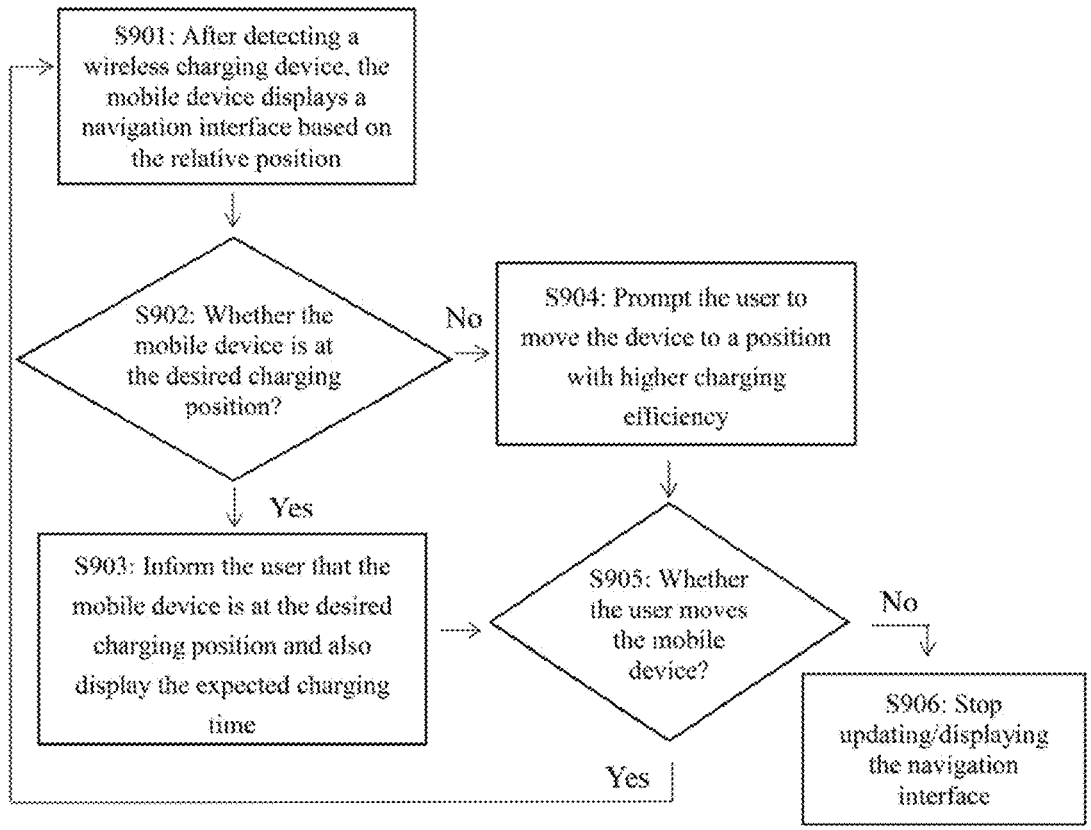
FIG. 9 illustrates a flow chart of an example of using a method consistent with various embodiments of the present disclosure to charge a mobile device.

FIG. 9 illustrates a flow chart of an example of using a method consistent with various embodiments of the present disclosure to charge a mobile electronic device. Referring to FIG. 9, the process to use the disclosed method to charge the mobile electronic device may include the following frames.

S901: When an electronic device is placed on a wireless charging device, the electronic device may detect the presence of the wireless charging device through the first induction coil of the electronic device. In addition, the electronic device may determine the relative position between the electronic device and the wireless charging device and may also display a navigation interface based on the relative position.

S902: The electronic device may then determine whether the present position of the electronic device, represented by the relative position, is at a desired charging position or an optimal charging position.

S903: When the present position of the electronic device is determined as the desired charging position, the electronic device may inform the user that the mobile device is at the desired charging position. In addition, the expected charging time corresponding to the present position of the electronic device may also be displayed.

S904: When the present position of the electronic device is determined as an undesired charging position, the electronic device may send out a prompt message to guide the user to move the device to a position with higher charging efficiency.

S905: The electronic device may keep monitoring whether the user moves the electronic device.

When it is determined that the electronic device is moved, the process to use the disclosed method to charge the electronic device may return to S901. That is, the mobile device may detect the wireless charging device, determine the relative position of the electronic device, and then display a navigation interface based on the relative position. Further, the charging process may once again determine whether the electronic device is now at the desired charging position, and then determine whether a prompt message may need to be sent out to guide the user to move the electronic device for higher charging efficiency.

However, when it is determined that the electronic device is not moved, the process to use the disclosed method to charge the electronic device may move to S906, that is, updating or displaying the navigation interface may be stopped.

In actual charging process, once the electronic device is coupled to the wireless charging device and the charging process is initiated, the electronic device may keep monitoring the relative position between the electronic device and the wireless charging device and then determine whether a prompt message may need to be sent out to guide the user to move the electronic device. The real time position detection and moving direction guidance may still be active even when the electronic device is at the desired charging position. Specifically, when the electronic device is at the desired charging position, the navigation interface may not be updated or may not even be displayed because the electronic device does not need to be moved. However, when the electronic device is indeed moved away from the desired charging position, the electronic device may immediately determine that the present position of the electronic device is away from the desired charging position and a prompt message to guide the user to move the electronic device back to the desired charging position may thus be sent out.

According to the disclosed methods and electronic devices, during a wireless charging process, when outputting a prompt message is determined based on the value of the first charging parameter, the prompt message may be sent out to guide the user to move the electronic device to a second relative position where the electric power obtained by and converted through the first coil of the electronic device may be higher. As such, the charging efficiency of the electronic device may be improved and the charging time may be reduced. In the meantime, the user may become to know the desired charging position through the prompt message, and thus user experience may be improved.

For illustration purposes, the disclosed methods and electronic devices are described based on the division of various functions of the modules. In actual applications, the various functions described above may be realized by different functional modules based on actual needs. That is, the internal structure of the electronic device may be divided into different functional modules in order to realize all or a part of the functions. The specific operation procedures of the systems, devices, and units described above may be referred to the corresponding description illustrated in the above embodiments.

The methods and devices described in the above embodiments may be realized through other approaches. That is, the description on the methods and devices in the above embodiments may only be schematic examples. For instance, the modules or units may be merely defined based on their logical functions, and in actual applications, the modules or units may be defined based on other criteria. For example, multiple units or components may be combined together or be integrated into another system, or some features may be ignored or may not be executed. Moreover, the coupling between the modules, units, and components illustrated or discussed above may be direct coupling or communication connections through some indirect coupling or communication connections between interfaces, devices, or units. The coupling may be electrical, mechanical, or in any other appropriate form.

The modules or units described separately above, may or may not be physically separated. Each component illustrated and discussed above as a unit may or may not be a physical unit. That is, the component may be located at a certain position, or may be distributed to multiple network units. Moreover, based on the needs of actual applications, all or a part of the units may be used to realize the methods consistent with disclosed embodiments.

Further, various functional units discussed in the disclosed embodiments may be integrated in a single processing unit or may be physically independent from each other. In addition, a plurality of units formed by integrating two or more than two functional units together may further form a processing unit. The integrated units described above may be realized through hardware or through software functional units.

When the integrated units are realized through software functional units, and are sold and used as independent products, the integrated units may be stored on computer readable storage media. Based on this understanding, all or a part of the generic principles or the scope of the invention may be embodied in software products. The computer software products may be stored in storage media and may include a plurality of commands to instruct a computer system (such as personal computer, server, network system, etc.) or a processor to execute all or a part of the procedures described in various embodiments consistent with the present disclosure. The storage media may include U disk, mobile hard disk, read-only memory (ROM), random access memory (RAM), magnetic disk, optical disk, or any other appropriate media that can be used to store program code.

For example, a computer program corresponding to the disclosed method for prompting charging position may be stored on an optical disk, a hard disk, a U disk, or any other appropriate storage media. When the computer program, corresponding to the disclosed method for prompting charging position, stored in the storage media is read out or executed by an electronic device, the execution of the computer program may include the following steps.

A value of a first charging parameter may be obtained through a first induction coil of the electronic device.

Based on the value of the first charging parameter, whether a prompt message needs to be sent out may be determined. The prompt message may be used to guide the user to move the electronic device and thus change the relative position between the electronic device and the wireless charging device from a first relative position to a second relative position. Specifically, the electric power obtained by and converted through the first induction coil when the relative position between the electronic device and the wireless charging device is the first relative position may be smaller than the electric power obtained by and converted through the first induction coil when the relative position between the electronic device and the wireless charging device is the second relative position.

The prompt message may be sent out through an output unit of the electronic device after outputting the prompt message is determined.

Optionally, the computer program stored in storage media may include a step to determine whether the prompt message may need to be sent out based on the value of the first charging parameter. Accordingly, the execution of the corresponding computer commands may further include judging whether the value of the first charging parameter meets a first preset condition. When the value of the first charging parameter meets the first preset condition, the position of the electronic device may be determined as an optimal charging position, and accordingly, it is determined that no prompt message may need to be sent out. However, when the value of the first charging parameter does not meet the first preset condition, the position of electronic device may then be determined as a non-optimal charging position, and accordingly, it is determined that a prompt message may need to be sent out. Moreover, when the electronic device is located at the optimal charging position, the time used to fully charge the electronic device may be the shortest.

Optionally, the computer program stored in storage media may include a step to determine whether a prompt message needs to be sent out based on the value of the first charging parameter. Accordingly, the execution of the corresponding computer commands may further include determining a first position of the electronic device based on the value of the first charging parameter and the predetermined correlation between the charging parameter and the position of the electronic device, and then determining whether the first position is the optimal charging position. When the electronic device is located at the optimal charging position, the time used to fully charge the electronic device may be the shortest.

Further, when the first position is the optimal charging position, it is determined that no prompt message needs to be sent out; however, when the first position is not the optimal charging position, it is determined that a prompt message may need to be sent out.

Optionally, the computer program stored in storage media may include a step to determine whether a prompt message needs to be sent out based on the value of the first charging parameter. Accordingly, the execution of the corresponding computer commands may further include acquiring the relative position between the electronic device and the wireless charging device based on a predetermined strategy during the process to obtain the value of the first charging parameter, and then determining whether a prompt message needs to be sent out based on the obtained relative position between the electronic device wireless charging device.

Optionally, the computer program stored in storage media may include a step to determine whether a prompt message may need to be sent out based on the relative position between the electronic device and the wireless charging device. Accordingly, the execution of the corresponding computer commands may further include determining that no prompt message needs to be sent out when the relative position indicates the first induction coil in the electronic device completely covers the second induction coil in the wireless charging device, or determining that a prompt message needs to be sent out when the relative position indicates the first induction coil in the electronic device does not completely cover the second induction coil in the wireless charging device.

Optionally, the computer program stored in storage media may include a step to output a prompt message through an output component of the electronic device. Accordingly, the execution of the corresponding computer commands may further include outputting a navigation interlace through a display unit of the electronic device and displaying a first content on the navigation interface. The first content may include a moving-direction indicator used to indicate a first direction to move the electronic device in order to reach the second relative position.

Optionally, the computer program stored in storage media may include other steps, and corresponding to these steps, the execution of the computer commands may also include displaying a second content on the prompt navigation interface. The second content may be used indicate the expected charging time to fully charge the electronic device at the present location.

According to the disclosed methods for prompting charging position and electronic devices, during a wireless charging process, when outputting a prompt message is determined based on the value of the first charging parameter, the prompt message may be sent out to guide the user to move the electronic device to a second relative position so that the electric power obtained by and converted through a first coil of the electronic device may become higher. As such, the charging efficiency of the electronic device may be improved and the charging time may also be reduced. In the meantime, the user may become to know the desired charging position through the prompt message, and thus user experience may be improved.

Further, in the present disclosure, relational terms such as first, second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present specification are described in a progressive manner, in which each embodiment focusing on aspects different from other embodiments, and the same and similar parts of each embodiment may be referred to each other. Because the disclosed devices correspond to the disclosed methods, the description of the disclosed devices and the description of the disclosed methods may be read in combination or in separation.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for prompting a charging position, comprising:
    measuring a magnetic flux near a first induction coil of an electronic device using at least one peripheral coil of the electronic device, the at least one peripheral coil being arranged near the first induction coil;
    obtaining a value of a first charging parameter according to the magnetic flux measured by the at least one peripheral coil of the electronic device;
    determining whether a prompt message needs to be sent out based on the value of the first charging parameter; and
    in response to determining that the prompt message needs to be sent out, sending out the prompt message through an output unit of the electronic device to guide a user to move the electronic device to change a relative position between the electronic device and a wireless charging device from a first relative position to a second relative position,
    wherein an electric power obtained by and converted through the first induction coil when the relative position between the electronic device and the wireless charging device is the first relative position is smaller than an electric power obtained by and converted through the first induction coil when the relative position between the electronic device and the wireless charging device is the second relative position.

2. The method for prompting charging position according to claim 1, wherein determining whether the prompt message needs to be sent out based on the value of the first charging parameter further includes:
    determining whether the value of the first charging parameter meets a first preset condition, wherein,
        when the value of the first charging parameter meets the first preset condition, the electronic device is determined to be at a desired charging position, and no prompt message needs to be sent out;
        when the value of the first charging parameter does not meet the first preset condition, the electronic device is determined to be at an undesired charging position, and the prompt message needs to be sent out; and
        a required charging time when the electronic device is at the desired charging position is shorter than a required charging time when the electronic device is not at the desired charging position.

3. The method for prompting charging position according to claim 2, wherein the first preset condition includes one of or a combination of any two or more of:
    a factory-preset condition of the electronic device;
    a user-revisable condition of the electronic device on the basis of the factory-preset condition of the electronic device; and
    a user-defined condition of the electronic device.

4. The method for prompting charging position according to claim 1, wherein determining whether the prompt message needs to be sent out based on the value of the first charging parameter further includes:
    determining a first position based on the value of the first charging parameter and a predetermined correlation between the first charging parameter and the position of the electronic device;
    determining whether the first position is a desired charging position, wherein a required charging time when the electronic device is at the desired charging position is shorter than a required charging time when the electronic device is not at the desired charging position;
    determining that no prompt message needs to be sent out when the first position is the desired charging position; and
    determining that the prompt message needs to be sent out when the first position is not the desired charging position.

5. The method for prompting charging position according to claim 1, wherein determining whether the prompt message needs to be sent out based on the value of the first charging parameter further includes:
    obtaining the relative position between the electronic device and the wireless charging device through a predetermined strategy during acquiring the value of the first charging parameter; and
    determining whether the prompt message needs to be sent out based on the obtained relative position between the electronic device and the wireless charging device.

6. The method for prompting charging position according to claim 5, wherein determining whether the prompt message needs to be sent out based on the obtained relative position between the electronic device and the wireless charging device includes:
    determining that no prompt message needs to be sent out when the relative position between the electronic device and the wireless charging device indicates that the first induction coil in the electronic device completely covers a second induction coil in the wireless charging device; and
    determining that the prompt message needs to be sent out when the relative position between the electronic device and the wireless charging device indicates that the first induction coil in the electronic device does not completely cover the second induction coil in the wireless charging device.

7. The method for prompting charging position according to claim 1, wherein outputting the prompt message through the output unit of the electronic device further includes:
outputting a navigation interface through the display unit of the electronic device; and
displaying a first content on the navigation interface, wherein:
the first content includes a moving-direction indicator used to indicate a first direction to move the electronic device in order to reach the second relative position.

8. The method for prompting charging position according to claim 7, further including:
displaying a second content on the navigation interface, wherein the second content is used to indicate a present position of the electronic device and an expected charging time to fully charge the electronic device.

9. The method for prompting charging position according to claim 1, wherein the first charging parameter includes at least one from electric current, electric voltage, magnetic flux, and other appropriate parameters.

10. An electronic device, comprising:
a first induction coil;
at least one peripheral coil arranged near the first induction coil;
an output unit; and
a processor coupled to the first induction coil, the at least one peripheral coil, and the output unit,
wherein the processor:
measures a magnetic flux near the first induction coil using the at least one peripheral coil;
obtains a value of a first charging parameter according to the magnetic flux measured by the at least one peripheral coil;
determines whether a prompt message needs to be sent out based on the value of the first charging parameter; and
in response to determining that the prompt message needs to be sent out, sends out the prompt message through the output unit of the electronic device to guide a user to move the electronic device to change a relative position between the electronic device and a wireless charging device from a first relative position to a second relative position,
wherein an electric power obtained by and converted through the first induction coil when the relative position between the electronic device and the wireless charging device is the first relative position is smaller than an electric power obtained by and converted through the first induction coil when the relative position between the electronic device and the wireless charging device is the second relative position.

11. The electronic device according to claim 10, wherein the processor further determines whether the value of the first charging parameter meets a first preset condition, wherein,
when the value of the first charging parameter meets the first preset condition, the electronic device is determined to be at a desired charging position, and accordingly, no prompt message needs to be sent out;
when the value of the first charging parameter does not meet the first preset condition, the electronic device is determined to be at an undesired charging position, and accordingly, the prompt message needs to be sent out; and
a required charging time when the electronic device is at the desired charging position is shorter than a required charging time when the electronic device is not at the desired charging position.

12. The electronic device according to claim 11, wherein the first preset condition includes one of or a combination of any two or more of:
a factory-preset condition of the electronic device;
a user-revisable condition of the electronic device on the basis of the factory-preset condition of the electronic device; and
a user-defined condition of the electronic device.

13. The electronic device according to claim 10, wherein the processor:
determines a first position based on the value of the first charging parameter and a predetermined correlation between the first charging parameter and the position of the electronic device;
determines whether the first position is a desired charging position, wherein a required charging time when the electronic device is at the desired charging position is shorter than a required charging time when the electronic device is not at the desired charging position;
determines that no prompt message needs to be sent out when the first position is the desired charging position; and
determines that the prompt message needs to be sent out when the first position is not the desired charging position.

14. The electronic device according to claim 10, wherein the processor:
obtains the relative position between the electronic device and the wireless charging device through a predetermined strategy during acquiring the value of the first charging parameter; and
determines whether the prompt message needs to be sent out based on the obtained relative position between the electronic device and the wireless charging device.

15. The electronic device according to claim 14, wherein the processor:
determines that no prompt message needs to be sent out when the relative position between the electronic device and the wireless charging device indicates that the first induction coil in the electronic device completely covers a second induction coil in the wireless charging device; and
determines that the prompt message needs to be sent out when the relative position between the electronic device and the wireless charging device indicates that the first induction coil in the electronic device does not completely cover the second induction coil in the wireless charging device.

16. The electronic device according to claim 10, wherein the processor:
outputs a navigation interface through the display unit of the electronic device; and
displays a first content on the navigation interface, wherein:
the first content includes a moving-direction indicator used to indicate a first direction to move the electronic device in order to reach the second relative position.

17. The electronic device according to claim 16, wherein the processor:
displays a second content on the navigation interface, wherein the second content is used to indicate a present position of the electronic device and an expected charging time to fully charge the electronic device.

18. The electronic device according to claim 10, the first charging parameter includes at least one from electric current, electric voltage, magnetic flux, and other appropriate parameters.

* * * * *